No. 885,723. PATENTED APR. 28, 1908.
C. B. COLE.
EDGE RUNNER GRINDING OR MIXING MILL.
APPLICATION FILED OCT. 12, 1906.

6 SHEETS—SHEET 1.

Witnesses
A J Haddan
D R Moore

Inventor
Caleb Bruce Cole
by his Attorney R Haddan

No. 885,723. PATENTED APR. 28, 1908.
C. B. COLE.
EDGE RUNNER GRINDING OR MIXING MILL.
APPLICATION FILED OCT. 12, 1906.

6 SHEETS—SHEET 3.

No. 885,723. PATENTED APR. 28, 1908.
C. B. COLE.
EDGE RUNNER GRINDING OR MIXING MILL.
APPLICATION FILED OCT. 12, 1906.

6 SHEETS—SHEET 4.

No. 885,723. PATENTED APR. 28, 1908.
C. B. COLE.
EDGE RUNNER GRINDING OR MIXING MILL.
APPLICATION FILED OCT. 12, 1906.

6 SHEETS—SHEET 5.

No. 885,723. PATENTED APR. 28, 1908.
C. B. COLE.
EDGE RUNNER GRINDING OR MIXING MILL.
APPLICATION FILED OCT. 12, 1906.

6 SHEETS—SHEET 6.

Witnesses
A J Haddas
S R Moore

Inventor
Caleb Bruce Cole
by his Attorney R H Hadden

UNITED STATES PATENT OFFICE.

CALEB BRUCE COLE, OF BRISTOL, ENGLAND.

EDGE-RUNNER GRINDING OR MIXING MILL.

No. 885,723.   Specification of Letters Patent.   Patented April 28, 1908.

Application filed October 12, 1906. Serial No. 338,653.

*To all whom it may concern:*

Be it known that I, CALEB BRUCE COLE, a subject of the King of England, residing at Bristol, England, have invented certain new and useful Improvements in Edge-Runner Grinding or Mixing Mills, of which the following is a specification.

This invention relates to edge-runner grinding and mixing mills for plastic substances particularly adapted for the pulverization and mixing of chocolate and the like and primarily consists in delivering the substance or substances under treatment directly from the edge-runner or roller by means of a delivery chute acting as a scraper in contact with said roller or rollers during the delivery operation.

The invention also consists in effecting a positive connection of said delivery chute with the usual rear scraper whereby the latter and the chute may be simultaneously put into and out of action respectively and vice versa, and in means for giving independent rotary drive to the bed and to the edge-runners.

Figure 1:
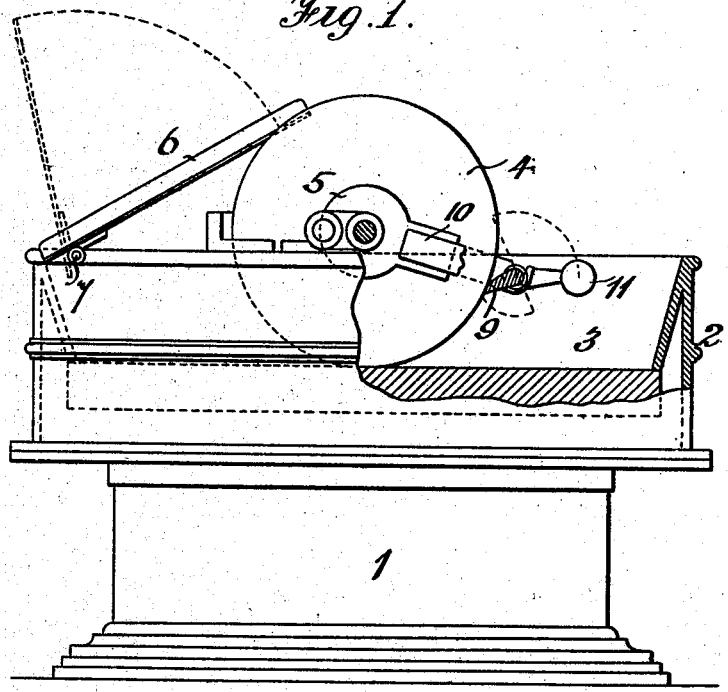
Figure 2:
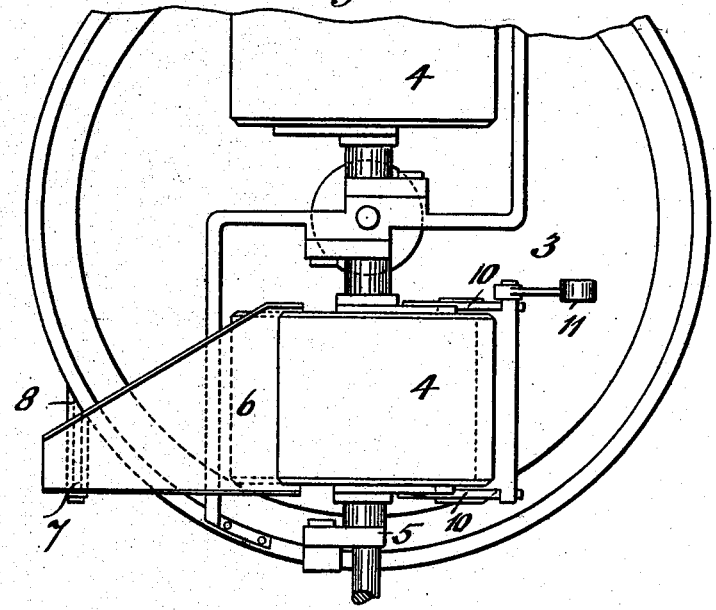
Figure 3:
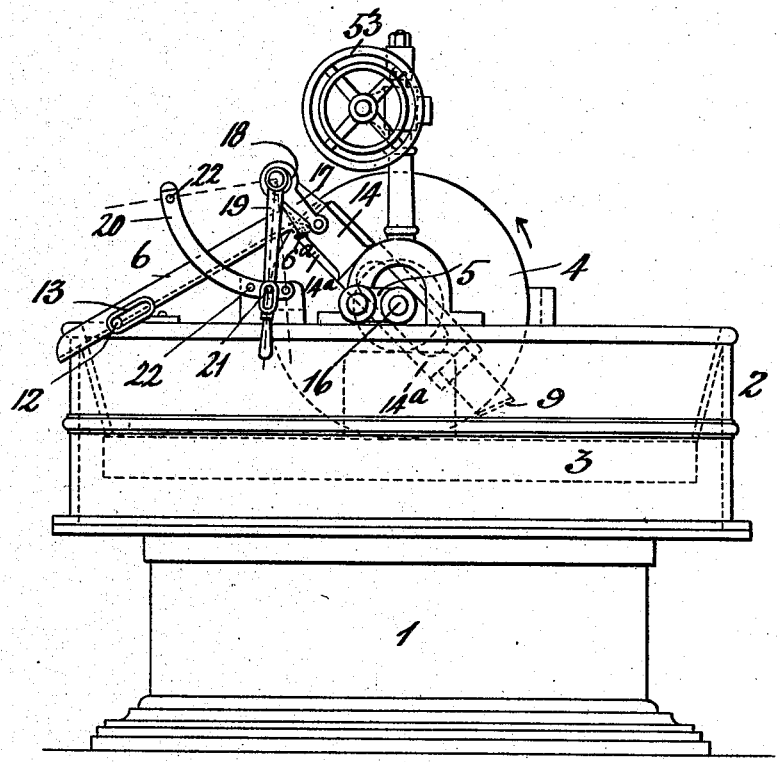
Figure 4:
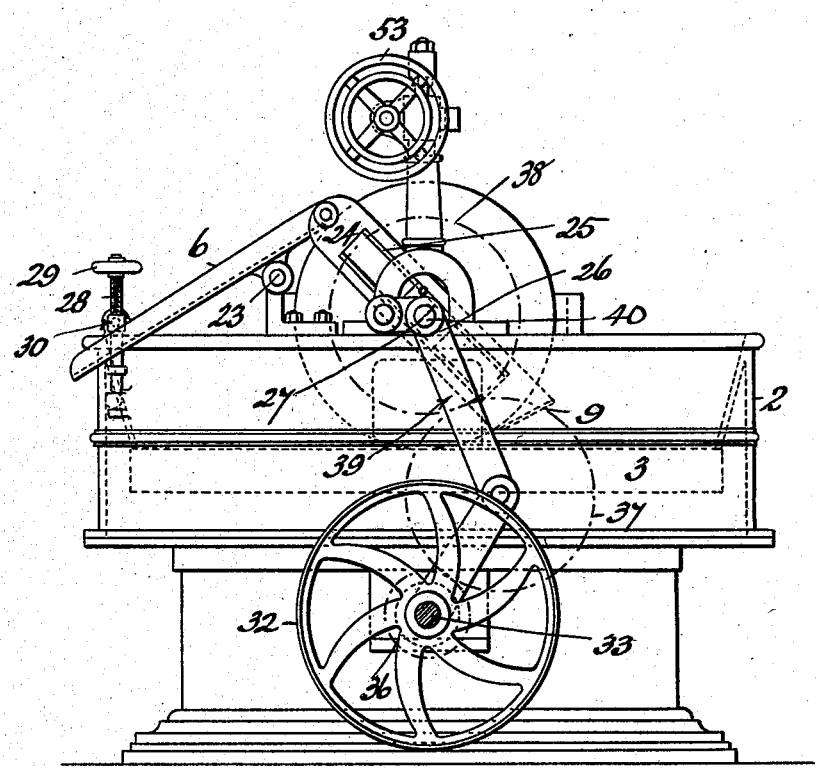
Figure 5:
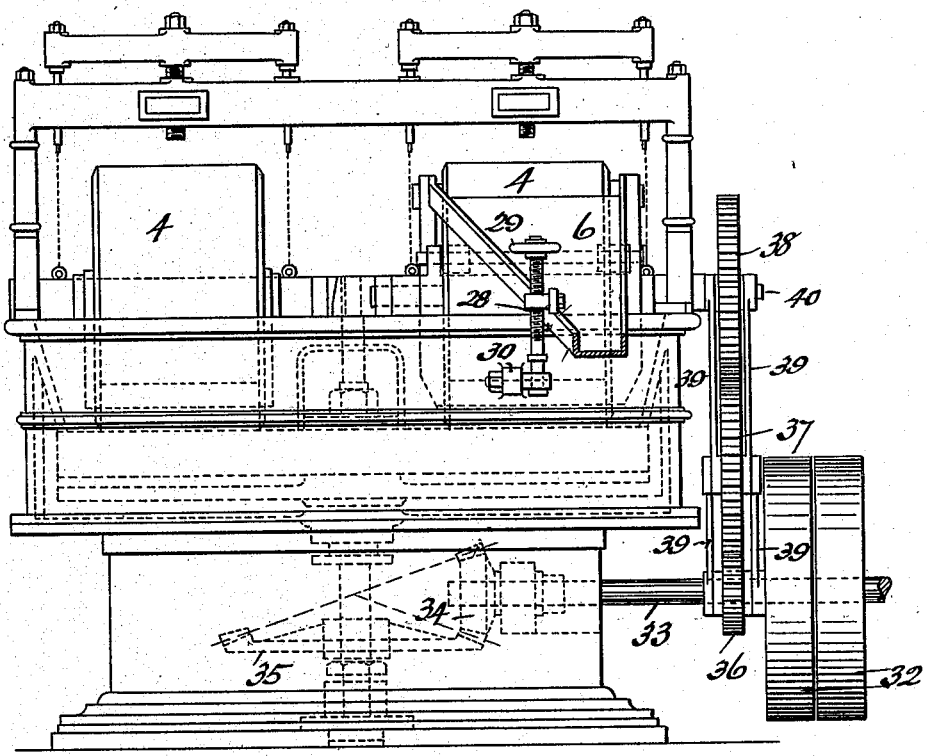
Figure 6:
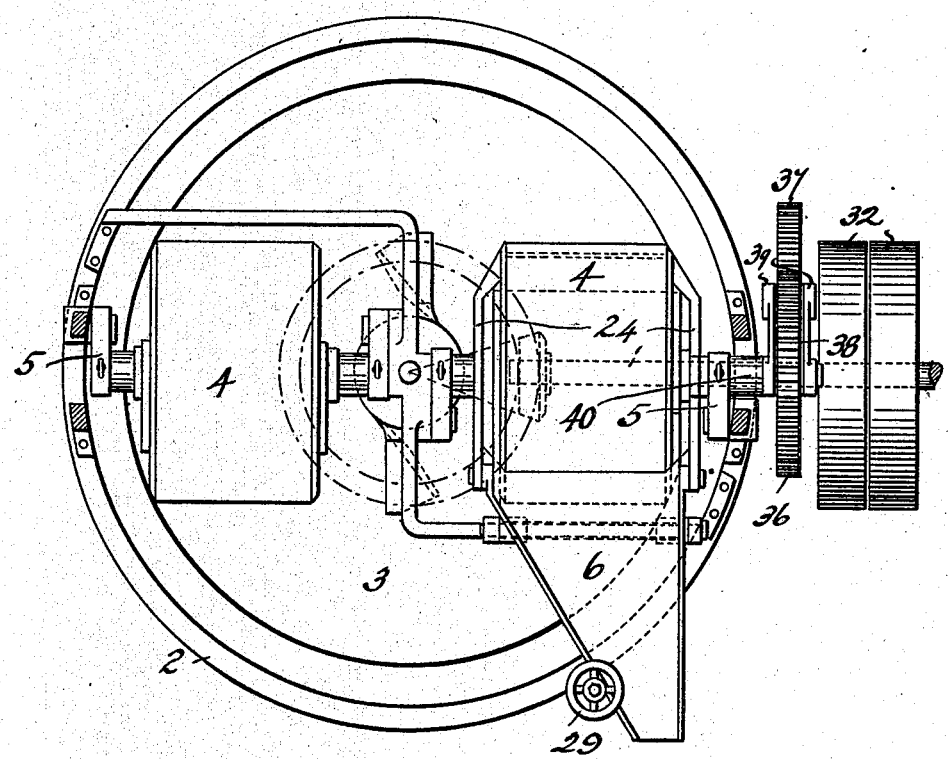
Figure 7:
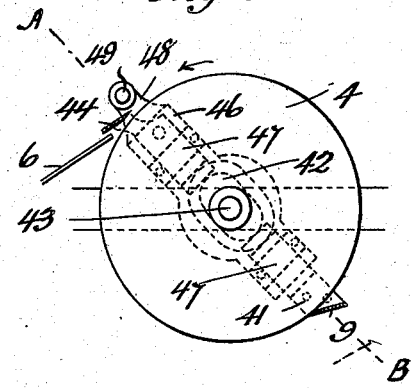
Figure 8:
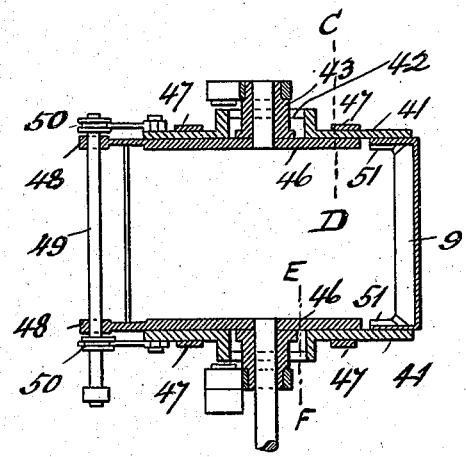
Figure 9:
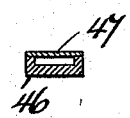
Figure 10:
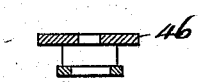

Several embodiments of the invention are represented in the accompanying drawings wherein Figures 1 and 2 are respectively a sectional elevation and a plan view of the simplest form of the machine showing a pivoted delivery chute adapted to collect the material from the top or upper part of a roller and having the known form of counterweighted rear-scraper. Fig. 3 is an elevation of a form of machine in which the delivery chute is connected to the rear scraper for simultaneous operation by means of a pivoted hand-lever. Figs. 4, 5 and 6 are a side elevation, end elevation and plan view respectively of a form of machine in which the delivery chute and rear scraper are connected in a different manner to that shown in Fig. 2 and adapted to be operated or adjusted by means of a screw spindle. These figures also show means for independently or separately driving the edge-runner rollers when desired. Figs. 7 to 10 represent a further manner of connecting the chute and rear scraper and modifications in the details of construction. Fig. 7 being a side elevation. Fig. 8 a section on the line A—B of Fig. 7 and Figs. 9 and 10 sections on the lines C—D and E—F of Fig. 8 respectively.

Referring to Figs. 1 to 6, 1 indicates the base of the machine, 2 the pan, 3 the bed or nether stone and 4 the edge-runners which may be mounted in the known manner in swinging brackets 5.

In Figs. 1 and 2 the delivery chute 6 is pivotally mounted at 7 in a bracket 8 projecting laterally from stationary border of the pan, its free end or edge being adapted to normally rest on or near the top or upper part of one of the edge runners 4 to collect the material therefrom. When not delivering the chute may be swung out of contact with the runner 4 as shown in dotted lines in Fig. 1. The usual or known form of rear-scraper 9 for scraping the material back on to the bed may be provided mounted in brackets 10, said scraper being held in contact with the runner by means of a counterweight 11 and adapted to be also swung out of contact as shown in dotted lines when the delivery chute is in operation.

In the form of machine shown in Fig. 3 the delivery chute 6 is pivoted at 12 in slotted bearings 13 and the scraper 9 is connected to or integral with slidable bars 14 having slots engaged by the trunnions 16 of the runner 4 and working on or in guides 14$^a$. To the said bars 14 are connected links 17 adapted to be operated by a cam or eccentric 18 and hand lever 19 which may be held in the desired position by means of a segment 20 and locking pin 21 engaging holes 22 therein. The arrangement and connection of the bars 14 and chute 6 is such that when the scraper 9 is brought into contact with the runner 4 the chute is thrown out of contact therewith and vice versa, for instance the chute 6 is connected to the bars 14 by a pivotal connection 6$^a$.

Referring to the form of machine shown in Figs. 4, 5 and 6 the delivery chute 6 is pivoted between its ends as at 23 and is pivotally connected at the runner end to slidable bars 24 having slots 25 working on blocks 26 on the runner trunnions 27 said bars 24 being connected to or integral with the rear scraper 9. The adjustment or operation of said chute and scraper in this construction is effected by means of a hand wheel 29 and screw spindle 28 engaging a nut or block 30 on the chute. By this means it will be seen that when the discharge end of the chute is depressed by the screw spindle and the opposite end raised out of contact with the runner 4, the scraper 9 is brought into contact with said runner, and vice versa. In these figures I have also illustrated means for independently rotating the edge runners instead of same being revolved by frictional contact with the nether-stone or bed 3 in the known manner. This independent driving is necessary for the revolving of the runners and of the bed when the runners are raised for lifting the material from the pan in order that it may be removed by the chute, and it may become necessary also when the substance or substances being treated is of so liquid a nature, (for instance when chocolate contains a large proportion of cocoa butter) that the runners will not be revolved by the bed. For this purpose, in connection with the gearing or mechanism which drives the bed for example fast and loose pulleys 32 shaft 33 and bevel gearing 34, 35, I provide a train of gear wheels 36, 37 and 38, mounted respectively on the shaft 33, in arms 39 and on the edge runner shaft 40.

In Figs. 7 to 10 the rear scraper 9 is mounted on slidable bars 41 each having a slot 42 for passage of the bosses or trunnions 43 and connected at its other end to a second scraper 44 adapted when in contact with the roller 4 to deliver the material to the chute 6 which in this case may be rigidly mounted in the machine. The bars 41 work in channeled guides 46 being held therein by cross plates 47, these guides having lugs 48 for passage of the eccentric shaft 49, the eccentrics 50 thereon being connected to the bars 41 in a similar manner to the construction shown in Fig. 3. The scraper 9 is slid in between the bars 41 and bolted thereto and preferably has lateral scraping surfaces 51 for acting upon the sides of the roller.

The known mechanism 53 may be provided for raising the rollers from the bed and the slots 15 and 42 in the sliding bars 14 and 41 respectively carrying the rear scraper, and the slotted mounting of the chute 6 (Fig. 3) permits this to be carried out without affecting the connection of said chute and scraper.

I wish it to be understood that I do not limit myself to the exact arrangement of parts shown and described or to the particular means specified for connecting and simultaneously operating the delivery chute and rear scraper.

What I claim as my invention and desire to secure by Letters Patent of the United States is:—

1. In an edge-runner grinding or mixing mill the combination with a horizontally revolving bed and vertical revolving grinding roll coöperating therewith, of a displaceable chute and scraper adapted to be brought into direct contact with the grinding roll to collect the ground material therefrom and deliver it clear of the bed, substantially as described.

2. In an edge-runner grinding or mixing mill, the combination with a horizontally revolving bed and a vertical revolving grinding roll coöperating therewith, of a displaceable scraper adapted to be brought into direct contact with the grinding roll to collect the ground material therefrom and deliver it clear of the bed, an auxiliary scraper for removing the material from the roll back onto the bed, and means for positively connecting said scrapers, whereby when the first mentioned scraper is in contact with the roll the auxiliary scraper is out of contact therewith and vice versa, substantially as described.

3. In an edge-runner grinding or mixing mill the combination with a stationary flanged pan, a horizontally revoluble bed therein, and a vertical grinding roll coöperating therewith, of a delivery chute pivoted horizontally to the pan and adapted to be brought into direct contact with the grinding roll above the level of the edge of the pan to collect the ground material from said roll and deliver it clear of the pan.

4. In an edge-runner grinding or mixing mill the combination with a horizontally revoluble bed and vertical grinding roll, means for lifting the grinding roll from the bed, independent driving gear for rotating said grinding roll and bed severally and independently of each other at different speeds, and a chute adapted to be brought in contact with the grinding roll for stripping material lifted thereby from the pan, said chute being constructed to deliver the stripped material clear of the bed.

In witness whereof I have signed this specification in the presence of two witnesses.

CALEB BRUCE COLE.

Witnesses:
E. M. TOLESTON,
A. W. SMITH.